Feb. 5, 1929.
C. CAMILLI ET AL
1,701,358
ELECTRIC MEASURING APPARATUS
Filed Dec. 8, 1926
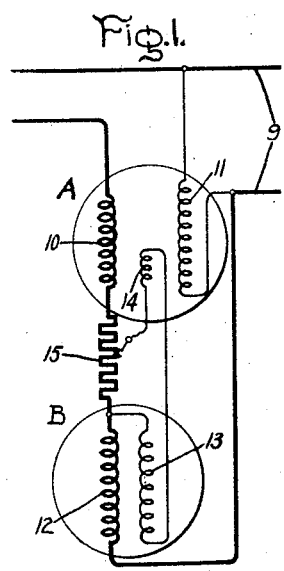
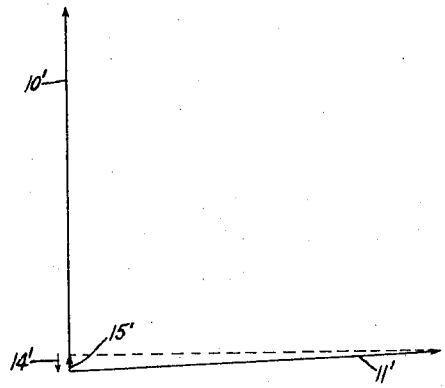
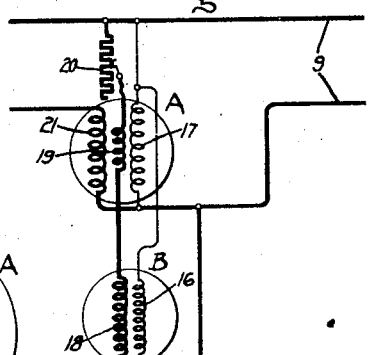
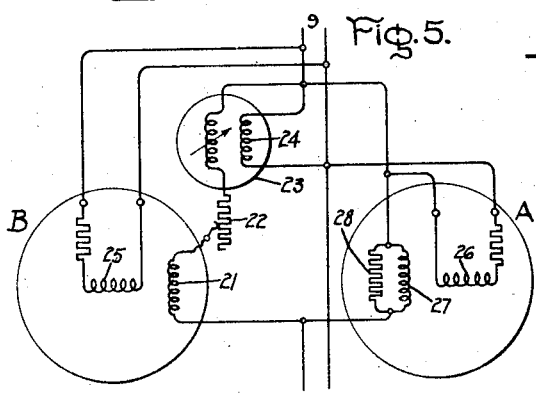
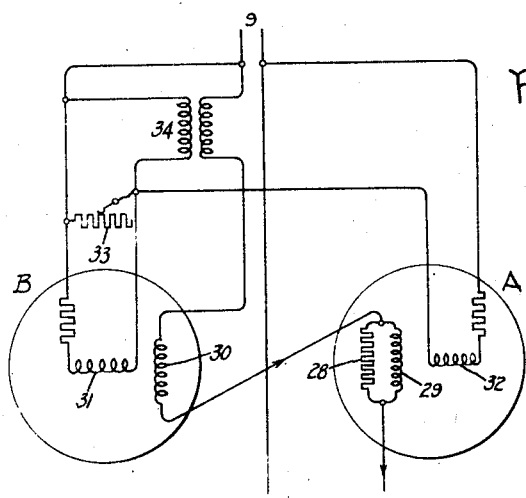
Inventors:
Guglielmo Camilli,
Aram Boyajian,
by *Alexander S. ____*
Their Attorney.

Patented Feb. 5, 1929.

1,701,358

UNITED STATES PATENT OFFICE.

GUGLIELMO CAMILLI AND ARAM BOYAJIAN, OF PITTSFIELD, MASSACHUSETTS, ASSIGNORS TO GENERAL ELECTRIC COMPANY, A CORPORATION OF NEW YORK.

ELECTRIC MEASURING APPARATUS.

Application filed December 8, 1926. Serial No. 153,428.

Our invention relates to a method of and apparatus for measuring the power of alternating current circuits and is particularly beneficial for measuring these quantities when due to the phase relation between current and voltage the quantity is relatively small as for example in the measurement of power at very low power factors.

The ordinary wattmeter is not suitable for the accurate measurement of power at very low power factors. More sensitive measuring apparatus than the ordinary wattmeter has been provided for this purpose but in general such apparatus is delicate, complicated and expensive. It is the object of our invention to provide accurate, rugged and relatively inexpensive apparatus for the purpose under consideration.

In carrying our invention into effect we prefer to employ two wattmeters. One of these wattmeters is employed to obtain a measuring current for the second wattmeter of such magnitude and phase angle that the desired measurement may be made under ideal conditions by the second wattmeter.

The features of our invention which are believed to be novel and patentable will be pointed out in the claims appended hereto. For a better understanding of our invention reference is made in the following description to the accompanying drawing in which Fig. 1 shows the application of our invention where the wattmeter A is used to obtain a current for the voltage coil of the wattmeter B which is proportional to and in phase with the desired measuring component of the voltage; Figs. 2 and 3 are vector diagrams explanatory of the invention as applied in Fig. 1; Fig. 4 is substantially similar to Fig. 1 except that the wattmeter A supplies a measuring current to the current coil rather than to the potential coil of wattmeter B; Figs. 5 and 6 show further applications of the invention.

Referring to Fig. 1, let us assume that it is desired to measure the power of a circuit 9 in which the power factor is very low, say for example, cos $\varphi = .01$. The power of the circuit is therefore EI cos $\varphi$, E and I being the voltage and current respectively. If we have an ordinary 5 ampere, 110 volt wattmeter in which the full scale deflection is 500 watts, it is seen that even with the coils energized at full rating the power is only $5 \times 110 \times .01 = 5$ watts. Such a reading would be practically impossible to observe accurately since it would correspond to about one scale graduation for the ordinary wattmeter. Aside from this, the accuracy of the ordinary wattmeter at such low power factors is poor, since the temperature and phase angle errors of the meter are at a maximum with respect to the power measurement.

In Fig. 1 the wattmeter A has the usual current coil 10 and voltage coil 11 connected in and across the circuit 9 as usual. Likewise, the wattmeter B has the usual current and voltage coils 12 and 13 respectively. Wattmeter A has in addition to the usual voltage coil 11 an auxiliary voltage coil 14 of few turns. These two voltage coils may be wound together and constitute the voltage winding of the meter. The auxiliary coil 14 of wattmeter A and the voltage coil 13 of wattmeter B are connected in series and supplied from some source having the same frequency and approximately the same phase angle as the current in the coils 10 and 12. Preferably these coils are supplied from a resistance 15 in the current circuit. Coils 11 and 14 are wound or are connected in opposition. The purpose of coil 14 is to supply a component equal and opposite to the power component of coil 11 so that this wattmeter will read zero. Fig. 2 shows the vector relations of the currents in the coils of wattmeter A and Fig. 3 those of wattmeter B.

In Fig. 2 10' represents the vector of the current in coil 10, 11' the vector of the current in coil 11. The power component of vector 11', which is in phase with 10', is represented at 15'. The current in coil 14 is adjusted until this wattmeter reads zero and then we know that the power component supplied by coil 14, which is represented at 14', Fig. 2, is equal and opposite to the power component 15'. Now, the voltage current of wattmeter B is in phase or substantially in phase with the current in its current coil 12 so that this wattmeter is operating at substantially unity power factor. Now if the number of turns in coil 13 is say 100 times the turns in coil 14, wattmeter B will give a large scale deflection which if the meter is accurate will be an accurate measurement of the power of circuit 9 and we may represent the vectors of the ampere-turns of coils 12 and 13 as 12' and 13' respectively, Fig. 3. It is not essential that the current in coils 13 and 14 be exactly in phase with that in coils 10 and 12, because the vector relation of the current in coils 13 and 14 will always be the same and the same relation of the power-component neutralized in wattmeter A is supplied to meter B. Wattmeter B is not only operating at substantially unity power factor where the phase angle and temperature errors are a minimum, but it gives 100 times the deflection in the example given that an ordinary wattmeter would give for the same measurement. The zero reading wattmeter A need not have any scale but merely a zero mark. The accuracy of the method depends upon adjusting the current in coil 14 so that this meter reads zero. This is a null method of adjustment easily obtainable to a high degree of accuracy by the proper design of the A meter.

In the remaining figures A and B are used to designate the zero reading and measurement meters respectively.

In Fig. 4, the voltage coils 16 and 17 of the wattmeters A and B are connected in parallel across the circuit 9. The current coil 18 of meter B is connected in series with an auxiliary current coil 19 and an adjusting resistance 20 across the circuit 9. The main current coil 21 of meter A supplies the wattless and watt components of the circuit, the latter of which is neutralized by coil 19 so that meter B is supplied by substantially in phase currents proportional to the power of the circuit when meter A is adjusted by means of the resistance 20 to read zero.

Fig. 5 shows an application of the invention where the current coils of the A and B wattmeters are connected in parallel. In this case wattmeter B is an ordinary type wattmeter, the current coil 21 of which is wound for smaller current and more turns than usual but for the same ampere turns as usual. For a 1% power factor load this current coil need not carry more than 1% of 5 amperes. If desired to take care of power factors as high as 10% the current coil 21 may be designed for ½ ampere in which case however the deflection for lower power factors would be smaller. Series multiple connections for this winding might also be used for doubling its power factor range. The current coil 21 of wattmeter B is shown as having in series with it a resistance 22, preferably not less than five times the reactance of the coil, the more the better. The purpose of this resistance is primarily to make the impedance angle of this branch as small as possible. Zero phase angle, that is unity power factor of the impedance, is not necessary and as much as 30 degrees in the phase angle of this branch is permissible without serious error in the readings. Thus no calibration of the resistance 22 is necessary. This branch also contains a source of variable voltage obtained by means of the variable transformer device 23, the primary coil 24 of which is excited from the line voltage as are the voltage coils 25 and 26 of the two wattmeters through potential transformers, if necessary. The purpose of the device 23 is to assist in the resolution of the line current into power and reactive components as will be explained presently. The current coil 27 of the A wattmeter which is connected in parallel with coil 21 in the circuit 9 is intended to carry the bulk of the reactive component of the line current, which means the bulk of the line current for low power factors, and is therefore designed to carry say 5 amperes and is suitable for use with the usual current transformer. Preferably a resistance 28 is connected in shunt to this coil to compensate for the phase angle error of the potential coil 26.

The operation of this modification is as follows: Let us assume first that no voltage is introduced into the branch 21, 22 of the current circuit. Since the impedance of this branch will be many times, say from 100 to 1000 times, the impedance of branch 27, practically all the current, both the power and reactive components, will flow in branch 27. By means of the transformer device 23 a voltage is gradually introduced in branch 21, which is in phase with the line voltage, to produce a current in this branch which is approximately in phase with the line voltage. When the power component of this current is just equal to that of the line current, it means that the power component is flowing entirely through branch 21 and only the reactive component is flowing through branch 27. Wattmeter A therefore reads zero and the power is measured by wattmeter B at high power factor, large deflection and high accuracy. The proper adjustment might also be made by keeping 23 constant and adjusting the resistance 22.

Fig. 6 shows the same general scheme in which the power and reactive components of the voltage circuit are segregated for the purpose described. In this case the load current flows through the current coils 29 and 30 of the A and B meters respectively in series. This of course implies that the two coils will have the same current rating. The potential coils 31 and 32 are also connected in series relation but this does not mean that they have the same voltage. The connection shown is to provide a voltage across the potential coil 32 corresponding to the reactive component and a small voltage across coil 31 corresponding to the power component. For low power factor loads the coil 31 needs to be wound for only a small percentage of normal voltage and correspondingly larger current. The impedance of coil 31 will be very low as compared to that of coil 32. The potential coil 31 is shunted by a low adjustable resistance 33 which is preferably not more than 1/5th of the resistance of the coil itself. Coil 31 is also shunted by the secondary of a current transformer 34, the primary of which is connected in the line 9. The operation is as follows: Assume that the ratio of current transformer 34 is one to one and that the resistance 33 is adjusted to a minimum; the resistance 33 will carry two currents (1) that required of potential coil 32, and (2) that required of the transformer 34. So far as the first mentioned current is concerned, it will be very small, the drop across resistance 33 being neglible and practically all of the line voltage will be impressed across coil 32. The bulk of the current from transformer 34 will flow through the resistance 33 and thus there will be impressed across coil 31 a voltage in phase with the load current. Now, by varying the resistance 33 until meter A reads zero, it will be evident that the voltage drop across coil 31 is such that a current corresponding to the power component of the line voltage flows through coil 31 and that only the quadrature component flows in coil 32. There may be a small quadrature component across coil 31 also, but it does no harm to any part of the circuit or to the wattmeter readings. The derivation of the necessary inphase voltage from the load current may be obtained in various ways. Wattmeter B thus operates at high power factor and gives a large deflection of high accuracy.

In general the A or zero reading wattmeter of the modifications described above is made sensitive. This may be readily accomplished since we are not interested in a large scale deflection or in a rugged construction. The B wattmeter on the other hand may be made rugged and have a large scale deflection. These requirements which are incompatible to obtain in a single meter are by means of our invention divided between the two meters so that one meter satisfies one set of requirements and the other meter the other set of requirements. The conflict, or the difficulty, of obtaining these requirements in a single meter is thus avoided and each meter may be especially designed to fulfill its particular function with a high degree of accuracy.

In any of the examples given above, the B meter may be replaced by an ammeter and a voltmeter and the power obtained by calculation. Likewise the B meter may be of the integrating type and automatic means provided to maintain the zero reading on the A meter.

In accordance with the provisions of the patent statutes, we have described the principle of operation of our invention, together with the apparatus which we now consider to represent the best embodiment thereof, but we desire to have it understood that the apparatus shown and described is only illustrative and that the invention may be carried out by other means.

What we claim as new and desire to secure by Letters Patent of the United States, is,—

1. The method of measuring the power of a low power factor alternating current circuit subject to varying current and voltage which consists in obtaining a current in phase with and proportional to one of said variables, obtaining a second current substantially in phase with said variable but proportional to the component of the other variable which is in phase with the first mentioned variable regardless of variations in power factor, and measuring the inphase product of said two currents.

2. The method of measuring the power of a low power factor alternating current circuit which consists in obtaining a current in phase with and proportional to the circuit current, obtaining a second current substantially in phase with said first mentioned current, but proportional to the component of the circuit voltage which is in phase with the circuit current regardless of variations in power factor and measuring the inphase product of said currents.

3. Apparatus for measuring the power of low power factor alternating current circuits subject to varying current and voltage, comprising a wattmeter connected in said circuit, means for producing an auxiliary excitation in one of the windings of said wattmeter, which excitation is equal and opposite to the torque producing component of the main excitation of said winding, such that a null reading of the wattmeter is obtained, and a second wattmeter having one of its windings excited by said auxiliary excitation and the other winding excited by that variable of the circuit which is in phase therewith.

4. Apparatus for measuring the power of low power factor circuits comprising a zero reading wattmeter having usual current and voltage coils adapted to be connected in and to the circuit to be metered, an auxiliary voltage coil on said wattmeter, a second wattmeter having usual current and voltage windings, the current winding of which is adapted to be connected in the circuit to be metered and the voltage winding of which is connected in series with the auxiliary coil of the zero reading meter, and means for producing a current in said last mentioned circuit which is substantially in phase with the current of the circuit to be metered and which is of such magnitude as to reduce the reading of the zero reading wattmeter to zero.

5. Apparatus for measuring the power of low power factor alternating current circuits subject to varying current and voltage, comprising a senstive zero reading wattmeter having its windings connected to such a circuit in the usual way, a rugged large scale deflection wattmeter having one of its windings connected to said circuit in the usual way and its other winding connected in series circuit relation with an auxiliary winding section of the corresponding winding of the sensitive wattmeter, and means for producing a current in said last mentioned circuit substantially in phase with the current in the corresponding windings of said meters which are connected to the circuit in the usual way, and of such magnitude as to reduce the reading of the sensitive wattmeter to zero.

6. Apparatus for measuring the power of low power factor circuits comprising a zero reading wattmeter having the usual current and voltage coils connected in and to the circuit to be metered, an auxiliary voltage coil included in the voltage winding of said meter, a second wattmeter having the usual current and voltage coils, the current coil of which is adapted to be connected in series with the current coil of the first mentioned meter and the voltage coil of which is connected in series with said auxiliary voltage coil, a resistance in series with the current coils of said meters and an adjustable connection for exciting the auxiliary voltage coil of the first mentioned wattmeter and the voltage coil of the second mentioned wattmeter from said resistance.

7. The method of measuring the power of alternating current circuits of low power factor, subject to varying current and voltage, which consists in obtaining a current which is substantially in phase with one of the variables of the circuit and proportional to the component of the other variable which is in phase with the first mentioned variable regardless of variations in power factor, and using said current together with the variable with which it is substantially in phase, to obtain a substantially unity power factor power measurement.

In witness whereof, we have hereunto set our hands this third day of December, 1926.

GUGLIELMO CAMILLI.
ARAM BOYAJIAN.